(12) United States Patent
Nagashima et al.

(10) Patent No.: US 8,378,255 B2
(45) Date of Patent: Feb. 19, 2013

(54) LASER BEAM IRRADIATION APPARATUS

(75) Inventors: Takahiro Nagashima, Noda (JP); Hideo Miura, Noda (JP)

(73) Assignee: Miyachi Corporation, Chiba (JP)

( * ) Notice: Subject to any disclaimer, the term of this patent is extended or adjusted under 35 U.S.C. 154(b) by 306 days.

(21) Appl. No.: 12/734,704

(22) PCT Filed: Nov. 7, 2008

(86) PCT No.: PCT/JP2008/070319
§ 371 (c)(1), (2), (4) Date: May 18, 2010

(87) PCT Pub. No.: WO2009/066571
PCT Pub. Date: May 28, 2009

(65) Prior Publication Data
US 2010/0254418 A1 Oct. 7, 2010

(30) Foreign Application Priority Data

Nov. 19, 2007 (JP) .................................. 2007-299121
Feb. 18, 2008 (JP) .................................. 2008-035817

(51) Int. Cl.
*B23K 26/00* (2006.01)
(52) U.S. Cl. .................................................. 219/121.64
(58) Field of Classification Search ............. 219/121.63, 219/121.64
See application file for complete search history.

(56) References Cited

U.S. PATENT DOCUMENTS

| | | | | |
|---|---|---|---|---|
| 5,140,128 A * | 8/1992 | Jones et al. ............... | 219/121.72 |
| 6,363,087 B1 * | 3/2002 | Rice .................................... | 372/3 |
| 6,965,469 B2 * | 11/2005 | Avizonis et al. ........... | 359/341.1 |
| 7,184,621 B1 * | 2/2007 | Zhu ................................... | 385/24 |
| 8,059,930 B2 * | 11/2011 | Nakai et al. .................... | 385/123 |
| 2004/0218635 A1 * | 11/2004 | Schlueter et al. ................. | 372/6 |
| 2006/0201919 A1 * | 9/2006 | Nakayama et al. ...... | 219/121.63 |
| 2007/0164005 A1 * | 7/2007 | Matsuda et al. ......... | 219/121.61 |
| 2011/0249319 A1 * | 10/2011 | Savage-Leuchs .......... | 359/341.1 |
| 2012/0069861 A1 * | 3/2012 | Neuberger ........................ | 372/6 |

FOREIGN PATENT DOCUMENTS

| | | |
|---|---|---|
| JP | H03-064707 | 3/1991 |
| JP | 2004-276108 | 10/2004 |
| JP | 2006-305601 | 11/2006 |

* cited by examiner

*Primary Examiner* — Benjamin Sandvik
(74) *Attorney, Agent, or Firm* — DLA Piper LLP (US)

(57) ABSTRACT

[Problems]
A laser beam irradiation apparatus which can accurately perform a linear welding with a uniform width on an irradiation portion even if the overlap ratio is lowered is provided.

[Means for Solving the Problems]
A laser beam irradiation apparatus includes laser beam generation means for emitting a laser beam, an optical fiber for transmitting the laser beam incident on an input side face to an output side face, an incident optical unit for introducing the laser beam emitted from the laser beam generation means to the input side face of the optical fiber, and an emission optical unit for applying the laser beam emitted from the output side face of the optical fiber to an irradiation portion, wherein the core cross section of the optical fiber is formed to be rectangular, preferably oblong, throughout the optical fiber or in a range at a predetermined distance from the output side face, and the length of the range where the core cross section is rectangular is preferably set to 3 m or above.

4 Claims, 14 Drawing Sheets

L ≥ R

LASER BEAM IRRADIATION APPARATUS

TECHNICAL FIELD

The present invention relates to laser beam irradiation apparatus, and more particularly to a laser beam irradiation apparatus suited for seam welding of micro parts, component removal from a surface metal layer, and the like.

BACKGROUND ART

A conventional laser beam irradiation apparatus includes a laser beam generation means, an incident optical unit, an optical fiber, and an emission optical unit, as an example. When a laser beam such as pulse YAG laser beam is emitted from the laser beam generation means, the laser beam is concentrated by the incident optical unit, is then incident on the input side face of the optical fiber connected to the incident optical unit. The optical fiber includes a core having a circular cross section, and the laser beam is transmitted toward the output side face of the optical fiber while being reflected along the core thereinside. When the laser beam arrives at the output side face of the optical fiber, the laser beam is emitted from the output side face, and the laser beam is applied to a predetermined irradiation portion of a target to be irradiated through the emission optical unit. The predetermined irradiation portion means a welding portion if the conventional laser beam irradiation apparatus is a YAG laser welding machine. If the conventional laser beam irradiation apparatus is a laser beam processing apparatus, the predetermined irradiation portion means a surface metal layer or a point where a thin film formed on a surface has to be removed (see Patent Document 1, paragraphs 0014 and 0024, FIGS. 1, 4, and 5).

Patent Document 1; Japanese Patent Laid-open Publication No. 2004-276108

DISCLOSURE OF THE INVENTION

Problem to be Solved by the Invention

However, the conventional laser beam irradiation apparatus, in which the optical fiber has a circular core cross section, applies laser beam having a circular cross section (the shape of the spot S of laser beam) to an irradiation portion LP of a target to be irradiated W as shown in FIG. 22.

This point does not matter if the irradiation portion LP is smaller than the circular spot S of laser beam. However, if the irradiation portion LP is linear as shown in FIG. 22, circular spots S of laser beam are simply arranged, so that the welding width changes cyclically (in other words, the shape of skewered dumplings). Any linear uniform width required for seam welding cannot be obtained. As shown in FIG. 23, in terms of the laser beam intensity distribution, since the center thereof has peak intensity, the welding cross section shape becomes generally triangular (icicle shape), thereby possibly causing the failure of hermetic sealing by welding. Therefore, when seam welding is performed by the conventional laser beam irradiation apparatus, welding has to be performed with the overlap ratio OL of the laser beam circular spot S set to be a high value, for example about 50 to 90%, as shown in FIG. 24 and FIG. 25. Therefore, it is difficult to improve the speed and efficiency of welding.

Even if processing for removing the irradiation portion LP is performed by arranging laser beam circular spots S simply or overlapping the circular spots S, since part of the irradiation portion LP is left unremoved between neighboring laser beam spots S (part obtained by subtracting laser beam circular spots S from a linear irradiation portion LP with a uniform width (oblong)), it is difficult to remove a component from the irradiation portion LP accurately.

Furthermore, in recent years, micromachining to be performed on electronic equipment and the components thereof increasingly-demanded to be more miniaturized. The appearance of a device has been expected, which satisfies the demand, capable of applying thinner laser beam with higher machining accuracy.

In light of the above, it is an object of the present invention to provide a laser beam irradiation apparatus which can accurately perform a linear welding with a uniform width on an irradiation portion even if the overlap ratio is lowered, which can accomplish the component removal of an irradiation portion accurately, and which can apply thinner laser beam with higher machining accuracy.

Means for Solving the Problems

In order to achieve the above objects, a laser beam irradiation apparatus according to a first aspect of the present invention includes laser beam generation means for emitting a laser beam, an optical fiber for transmitting the laser beam incident on an input side face to an output side face, an incident optical unit for making incident the laser beam emitted from the laser beam generation means on the input side face of the optical fiber, and an emission optical unit for applying the laser beam emitted from the output side face of the optical fiber to an irradiation portion, the laser beam irradiation apparatus in which the core cross section of the optical fiber is formed to be rectangular throughout the optical fiber or in a range at a predetermined distance from the output side face.

According to the laser beam irradiation apparatus of the first aspect of the present invention, the shape of the cross section of the laser beam to be applied to an irradiation portion can be rectangular.

According to the laser beam irradiation apparatus of a second aspect of the present invention, in the laser beam irradiation apparatus of the first aspect, the length of the range where the core cross section is rectangular is set to 3 m or above.

According to the laser beam irradiation apparatus of the second aspect of the present invention, the cross-sectional intensity distribution of laser beam can be uniform.

According to the laser beam irradiation apparatus of a third aspect of the present invention, in the laser beam irradiation apparatus of either the first or the second aspect, each side of the rectangular cross section of the core is 150 times as long as or longer than the wavelength of the laser beam, and the emission optical unit reduces the laser beam emitted from an output side face of the optical fiber.

According to the laser beam irradiation apparatus of the third aspect of the present invention, the cross section shape of the laser beam to be applied to the irradiation portion can be rectangular, as well as the application of very thin laser beam with high machining accuracy can be achieved.

According to the laser beam irradiation apparatus of a fourth aspect of the present invention, in the laser beam irradiation apparatus of the third aspect, the reducing scaling factor by the emission optical unit is ½ to ⅕.

According to the laser beam irradiation apparatus of the fourth aspect of the present invention, a laser beam having a rectangular core cross section reduced to ½ to ⅕ of the original size thereof can be applied.

According to the laser beam irradiation apparatus of a fifth aspect of the present invention, in the laser beam irradiation apparatus of either the third or the fourth aspect, each side of the rectangular cross section of the optical fiber is 250 times to 350 times as long as the wavelength of the laser beam.

According to the laser beam irradiation apparatus of the fifth aspect of the present invention, each side of the rectangular cross section of the optical fiber can be shorter, as well as the cross-sectional intensity distribution of laser beam can be uniform.

According to the laser beam irradiation apparatus of a sixth aspect of the present invention, in the laser beam irradiation apparatus of any one of the third to fifth aspects, the wavelength of the laser beam emitted from the laser beam generation means is 600 nm or below.

According to the laser beam irradiation apparatus of the sixth aspect of the present invention, since the wavelength of laser beam is short, specifically 600 nm, each side of the rectangular cross section of the optical fiber can be further shorter, as well as the cross-sectional intensity distribution of laser beam can be uniform.

According to the laser beam irradiation apparatus of a seventh aspect of the present invention, in the laser beam irradiation apparatus of any one of the third to sixth aspects, the rectangular cross section of the optical fiber is formed to be oblong.

According to the laser beam irradiation apparatus of the seventh aspect of the present invention, the overlap ratio can further be lowered as well as thin laser beam can be generated even with a thick optical fiber, thereby improving micromachining speed.

According to the laser beam irradiation apparatus of a eighth aspect of the present invention, in the laser beam irradiation apparatus of any one of the third to seventh aspects, the laser beam generation means includes a multimode laser oscillator.

According to the laser beam irradiation apparatus of the eighth aspect of the present invention, the uniformity of the cross-sectional intensity distribution of laser beam can be improved.

According to the laser beam irradiation apparatus of a ninth aspect of the present invention, in the laser beam irradiation apparatus of either the first or the second aspect, the laser beam generation means includes a vertical multimode laser oscillator, and each side of the rectangular cross section of the core is formed to be 25 times as long as or longer than the wavelength of the laser beam.

According to the laser beam irradiation apparatus of the ninth aspect of the present invention, since a vertical multimode laser oscillator is employed as the laser beam generation means, thin laser beam can be generated by using a thin optical fiber.

According to the laser beam irradiation apparatus of a tenth aspect of the present invention, in the laser beam irradiation apparatus of the ninth aspect, the rectangular cross section of the optical fiber is formed to be oblong.

According to the laser beam irradiation apparatus of the tenth aspect of the present invention, the overlap ratio can further be lowered, thin laser beam can be generated with a thin optical fiber, and micromachining speed are improved.

Effects of the Invention

Since the laser beam irradiation apparatus according to the present invention can accurately perform linear welding with a uniform width even if the laser beam overlap ratio is lowered, welding efficiency can be improved without loss of airtightness by seam welding.

Since the laser beam irradiation apparatus according to the present invention can perform rectangular-spot etching on a surface metal layer, the surface metal layer can be removed accurately, thereby achieving the application of thinner laser beam with higher machining accuracy.

BEST MODE FOR CARRYING OUT THE INVENTION

Hereinafter, a laser beam irradiation apparatus of the present invention will be described with reference to the following embodiments.

Figure 1:
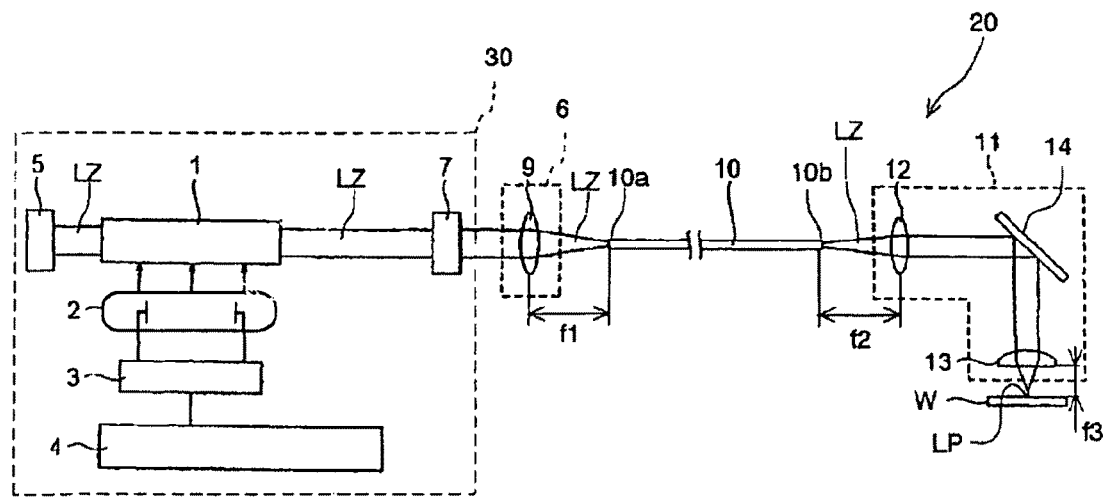
FIG. 1 shows a concept of a laser beam irradiation apparatus according to an embodiment.

FIG. 1 shows a concept of a laser beam irradiation apparatus 20 according to an embodiment of the present invention. The laser beam irradiation apparatus 20 of this embodiment generates a laser beam LZ by being pumped by light from a flash lamp, and then irradiates an irradiation portion LP of a target to be irradiated W with the laser beam LZ. The target W is welded or micromachined by the laser beam LZ. Examples of the target W include micro metal parts, surface metal layers, and metal films. As shown in FIG. 1, the laser beam irradiation apparatus 20 includes laser beam generation means 30, an incident optical unit 6, an optical fiber 10, and an emission optical unit 11.

The laser beam generation means 30 according to this embodiment includes a YAG (Yttrium-Aluminum-Garnet) rod 1, a flash lamp 2 such as a xenon lamp, a power supply 3, a controller 4, a total reflection mirror 5, and an output mirror 7. The YAG rod 1, which is one of a laser medium having excellent optical properties, is formed into a cylindrical column. The flash lamp 2 is positioned beside the YAG rod 1. Specifically, the laser beam generation means 30 according to this embodiment is a side-pumping YAG laser beam LZ generator, in which pumping light is applied directly to the YAG rod 1 from the flash lamp 2 positioned beside the YAG rod 1, so that atoms of the YAG rod 1 are pumped optically.

The power supply 3 is connected between the flash lamp 2 and the controller 4. Electric power is supplied by the controller 4 from the power supply 3 to the flash lamp 2. Through the power supply 3, the controller 4 controls the output of the laser beam generation means 30 and the properties of the laser beam LZ. The laser beam generation means 30 according to this embodiment is a YAG laser beam LZ generator. In order to achieve easy laser welding in a small area by using the laser beam irradiation apparatus 20 of this embodiment, the oscillation wavelength λ of the YAG laser is set to 1064 nm in the controller 4 according to this embodiment. In order to seam-weld a battery and microminiature components to electronic equipment easily and accurately by using the laser beam irradiation apparatus 20 according to this embodiment, the controller 4 of this embodiment controls lighting pulses of the flash lamp 2 through the power supply 3 so as to generate pulse YAG laser beams.

The total reflection mirror 5 is provided with a predetermined distance from one end of the YAG rod 1 (left end of the YAG rod 1 in FIG. 1). When a laser beam LZ is outputted from the one end of the YAG rod 1, the laser beam LZ is reflected perfectly from the total reflection mirror 5 toward the one end of the YAG rod 1.

The output mirror 7 is provided with a predetermined distance from the other end of the YAG rod 1 (right end of the YAG rod 1 in FIG. 1). The output mirror 7 has semi-transparency for allowing only a solid laser beam LZ to pass therethrough.

The incident optical unit 6 concentrates the laser beam LZ outputted from the output mirror 7 of the laser beam generation means 30, and then makes incident the laser beam LZ on the input side face 10a of the optical fiber 10. A condensing lens 9 is mostly employed for the incident optical unit 6 according to this embodiment. The focal length f1 of the condensing lens 9 is 40 mm.

Figure 2:
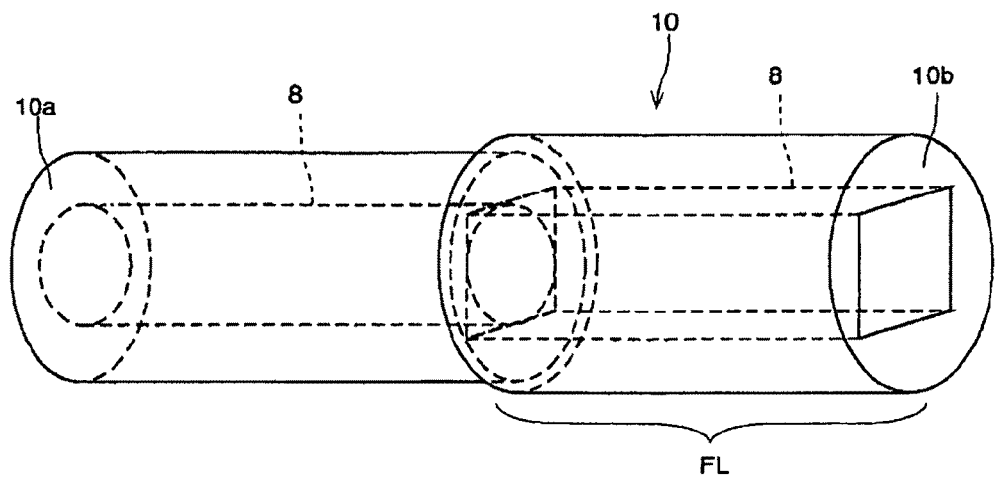
FIG. 2 is a perspective view showing an optical fiber according to the embodiment.

As shown in FIG. 1 and FIG. 2, the optical fiber 10 is an optical waveguide for transmitting laser beam LZ, by using a core 8 provided thereinside. The optical fiber 10 is provided between the incident optical unit 6 and the emission optical unit 11. Since the laser beam LZ is incident from the side of the incident optical unit 6, the end on the side of the incident optical unit 6 corresponds to the input side face 10a of the optical fiber 10, whereas the end on the side of the emission optical unit 11 to the output side face 10b thereof, in the optical fiber 10 according to this embodiment.

As shown in FIG. 2, the core 8 of the output side face 10b of the optical fiber 10 is rectangular in cross section. The cross section of the core 8 may be rectangular throughout the optical fiber 10. As shown in FIG. 2, the core 8 of the optical fiber 10 according to this embodiment has a rectangular cross section in a range at a predetermined distance FL from the output side face 10b, whereas the core 8 has a circular cross section in a range over the rest of the optical fiber 10. The predetermined distance FL (the total length of the optical fiber 10 if the core 8 has a rectangular cross section throughout the optical fiber 10) is preferably set to 3 m to 30 m, and more preferably 5 m to 10 m, from the viewpoint of the cross-sectional intensity distribution of laser beam LZ, outgoing numerical aperture (NA), and the usability of laser beam LZ.

Figure 3:
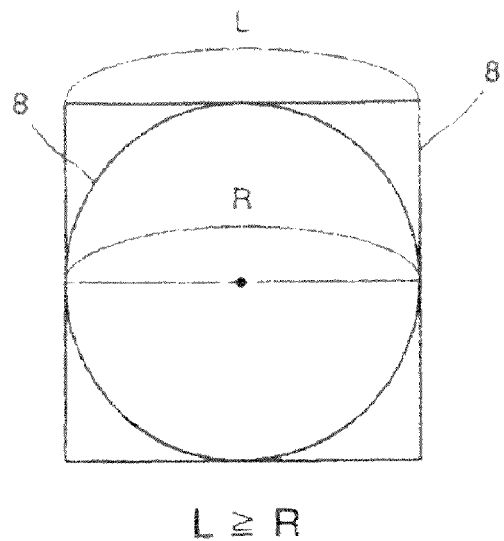
FIG. 3 is a cross-sectional view showing a core size of the optical fiber according to the embodiment.

In terms of the size of the core 8 of the optical fiber 10, as shown in FIG. 3, each side L of the rectangular cross section is 150 times as long as or longer than the wavelength λ of the laser beam LZ (L=0.52 mm=489λ in this embodiment). The relation between each side L of the rectangular cross section and the diameter R of the circular cross section is R≦L. In order to prevent transmission loss of the laser beam LZ, preferably, the diameter R of the circular cross section on the side of the input side face 10a approximately agrees with each side L of the rectangular cross section on the side of the output side face 10b, although the diameter R does not exceed each side L.

The emission optical unit 11 irradiates an irradiation portion LP of a target to be irradiated W with the laser beam LZ emitted from the output side face 10b of the optical fiber 10. The emission optical unit 11 mainly includes a collimator lens 12, a bent mirror 14, and a light-emission lens 13. The focal length f2 of the collimator lens 12 is 100 mm. The focal length f3 of the light-emission lens 13 is 50 mm. The focal lengths f2 and f3 are preferably varied depending on characteristics of the target W and irradiation conditions. In order to carry out laser micromachining and the like, it is preferable to scale down the rectangle created by the laser beam LZ emitted from the output side face 10b optically by using the emission optical unit 11, so that each side thereof becomes ½ to ⅕ of its original length in the irradiation portion LP. Specifically, the ratio between f3 and f2 is set to 1/2 to 1/5.

Next, a description is given for a laser welding method by using the laser beam irradiation apparatus 20 of this embodiment. In addition, effects of the laser beam irradiation apparatus 20 and the laser welding method according to this embodiment are also described.

An irradiation portion LP of a target to be irradiated W is laser-welded by the laser beam irradiation apparatus 20 shown in FIG. 1 through four steps.

In a first step, as shown in FIG. 1, the laser beam generation means 30 outputs a desired pulse YAG laser beam LZ to the incident optical unit 6. In the first step, specifically, at first, the controller 4 controls the power supply 3 to light up the flash lamp 2, so that atoms of the YAG rod 1 are excited. In this case, by pulse-lighting the flash lamp 2, the pulse width of the laser beam LZ is adjusted to a desired value. The laser beam LZ is outputted from both one end and the other end of the YAG rod 1. The laser beam LZ outputted from the one end of the YAG rod 1 is total-reflected by the total reflection mirror 5. The total-reflected laser beam LZ is inputted into the YAG rod 1 from the side of the one end of the YAG rod 1. The output mirror 7 provided on the side of the other end of the YAG rod 1 allows only solid laser beam LZ to pass therethrough. As a result, the laser beam generation means 30 outputs the desired pulse YAG laser beam LZ to the incident optical unit 6.

In a second step, as shown in FIG. 1, the laser beam LZ outputted from the laser beam generation means 30 is allowed to be incident on the input side face 10a of the optical fiber 10 through the incident optical unit 6. As a method of making incident the laser beam LZ, the condensing lens 9 of the incident optical unit 6 concentrates the laser beam LZ, based on the size of the optical fiber 10 and the incoming NA thereof.

In a third step, as shown in FIG. 1, the laser beam LZ becomes rectangular in cross section, and the rectangular laser beam LZ is emitted from the output side face 10b of the optical fiber 10. In the third step, specifically, the laser beam LZ is incident on the input side face 10a of the optical fiber 10 according to this embodiment, shown in FIG. 2. In the optical fiber 10 according to this embodiment, the core 8 of the optical fiber 10 has a rectangular cross section in a range at a predetermined distance FL from the output side face 10b. Therefore, even if the laser beam LZ incident on the optical fiber 10 has a circular cross section, when the laser beam LZ is emitted from the output side face 10b of the optical fiber 10, the laser beam LZ becomes rectangular in cross section. If the aforementioned predetermined distance FL along the optical fiber 10, specifically, if the length of the range of the optical fiber 10, where the core 8 has a rectangular cross section is set to 3 m or above, the cross-sectional intensity distribution of the laser beam LZ can be uniform. The predetermined distance FL of the optical fiber 10 will be described later in detail.

Figure 4:
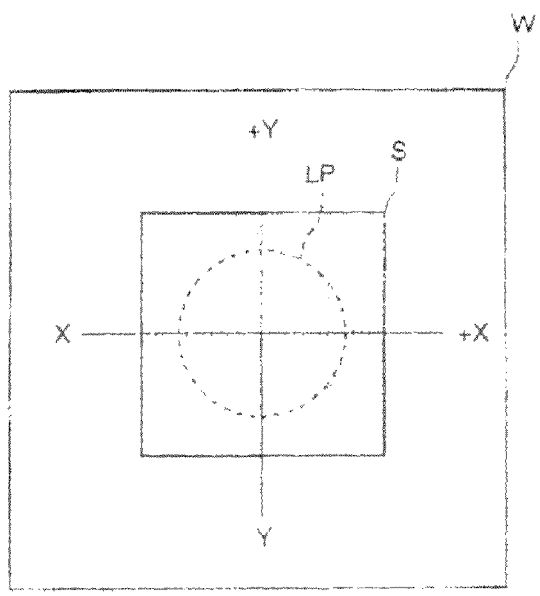
FIG. 4 is a plan view showing a state where the laser beam irradiation apparatus according to the embodiment applies a rectangular spot of laser beam to an irradiation portion of a target to be irradiated.

In a fourth step, as shown in FIG. 1, the laser beam LZ emitted from the output side face 10b of the optical fiber 10 is applied to an irradiation portion LP of a target to be welded W through the emission optical unit 11. As shown in FIG. 1, the emission optical unit 11 includes the collimator lens 12, the bent mirror 14, and the light-emission lens 13. Even when the laser beam LZ emitted from the output side face 10b of the through optical fiber 10 is applied to the irradiation portion LP, the laser beam LZ does not change in cross section. Therefore, as shown in FIG. 4, the cross section of the laser beam LZ to be applied to the irradiation portion LP can be rectangular (the shape of the spot S of the laser beam LZ).

Furthermore, in this embodiment, since the focal length ratio between the collimator lens 12 and the light-emission lens 13 is f3/f2=1/2, each side of the laser beam LZ becomes 0.26 mm=260 μm in the irradiation portion LP, the value which is a half of the length L=0.52 mm of each side of the optical fiber 10 formed into a rectangle. Therefore, micromachining can be performed by using the laser beam LZ having a rectangular cross section, being 260 μm on each side.

Figure 5:
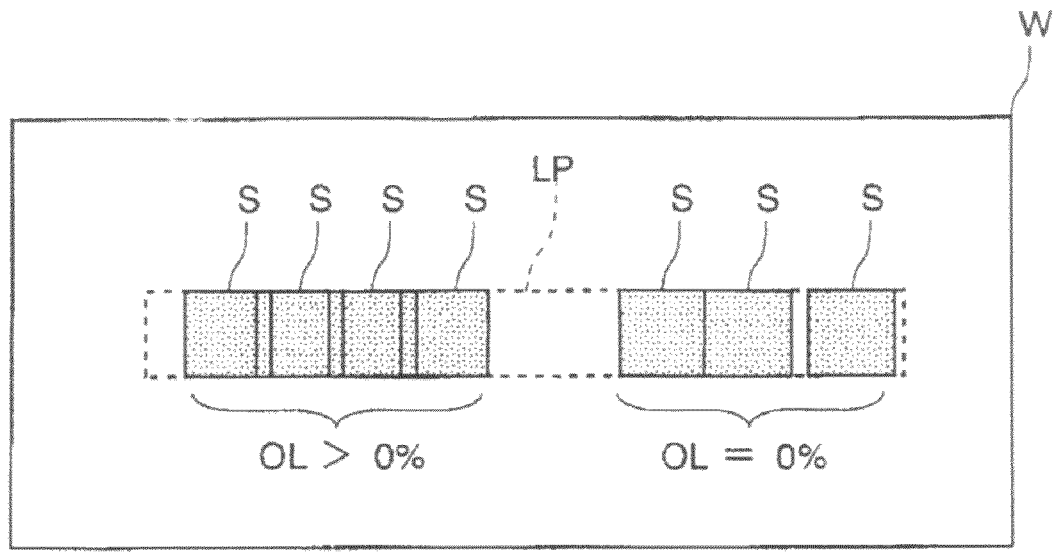
FIG. 5 is a plan view showing a state where the laser beam irradiation apparatus according to the embodiment has performed seam welding on the irradiation portion of the target to be irradiated by using laser beam.
Figure 6:
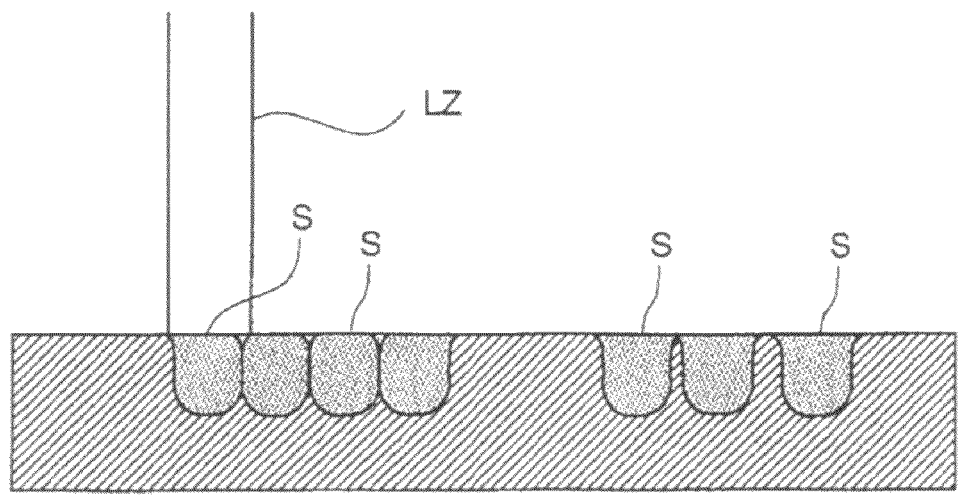
FIG. 6 is a cross-sectional view of FIG. 5.
Figure 21:
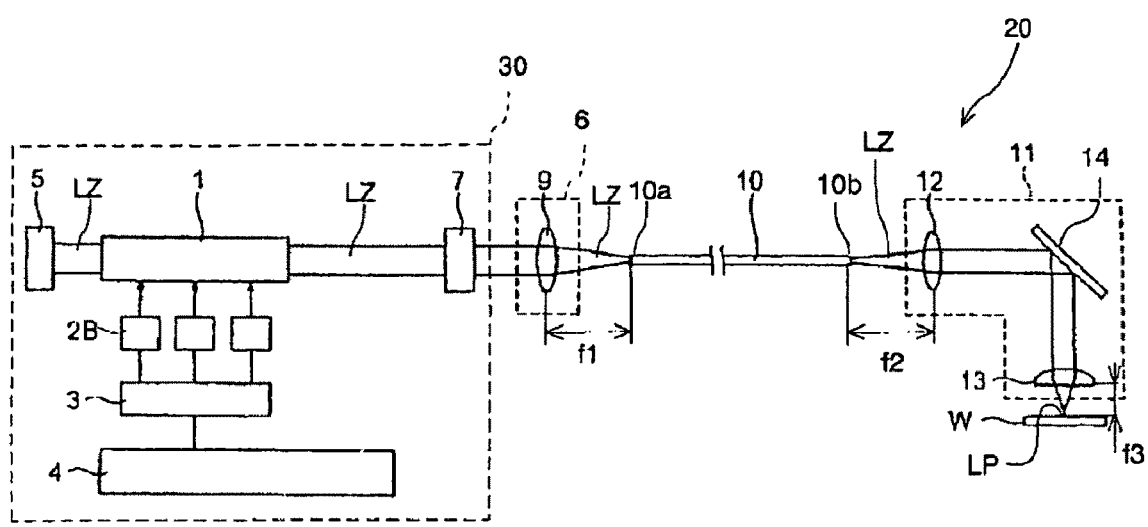
FIG. 21 shows a concept of a laser beam irradiation apparatus according to another embodiment.
Figure 22:
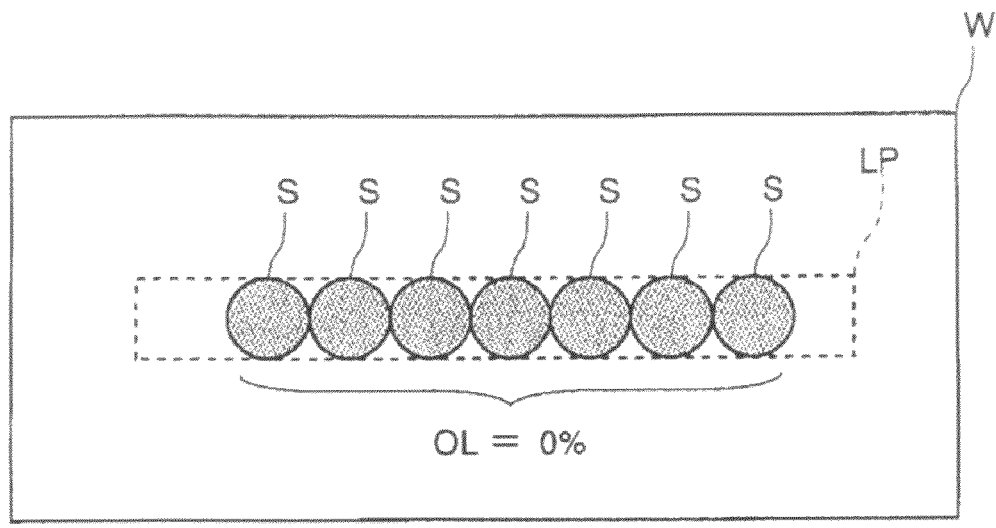
FIG. 22 is a plan view showing a state where a conventional laser beam irradiation apparatus applies laser beam to an irradiation portion of a target to be irradiated for seam welding at an overlap ratio of 0%.
Figure 23:
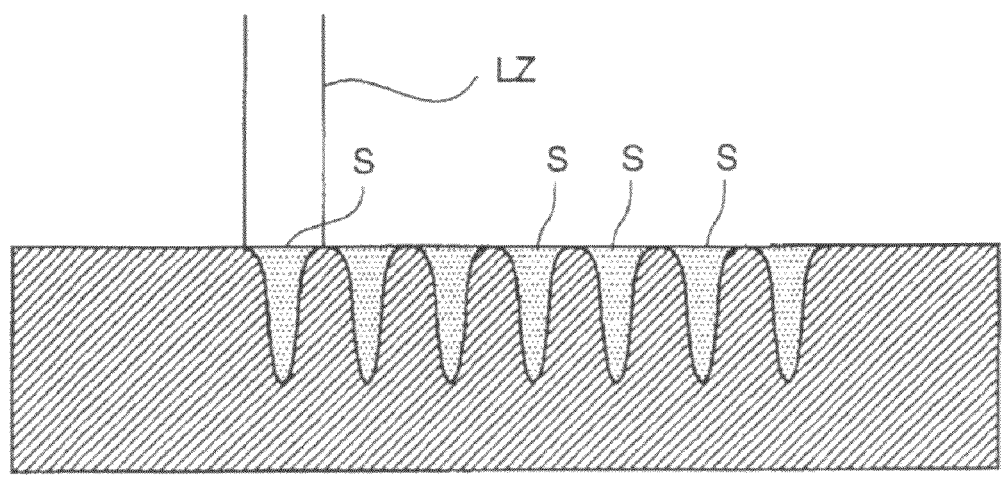
FIG. 23 is a cross-sectional view of FIG. 22.
Figure 24:
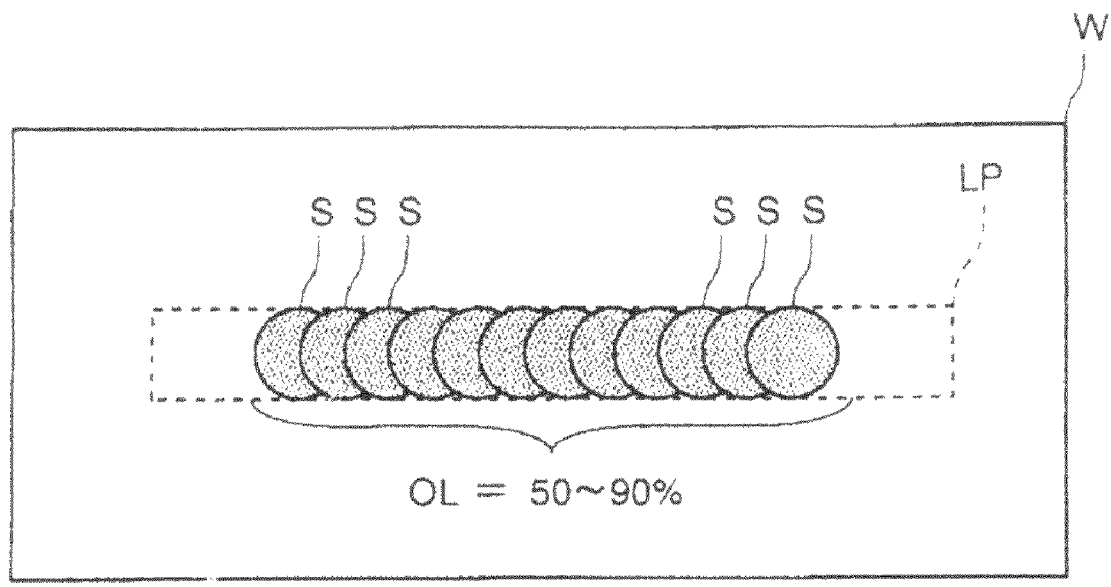
FIG. 24 is a plan view showing a state where a conventional laser beam irradiation apparatus applies laser beams to an irradiation portion of a target to be irradiated for seam welding at an overlap ratio of 50% to 90%.
Figure 25:
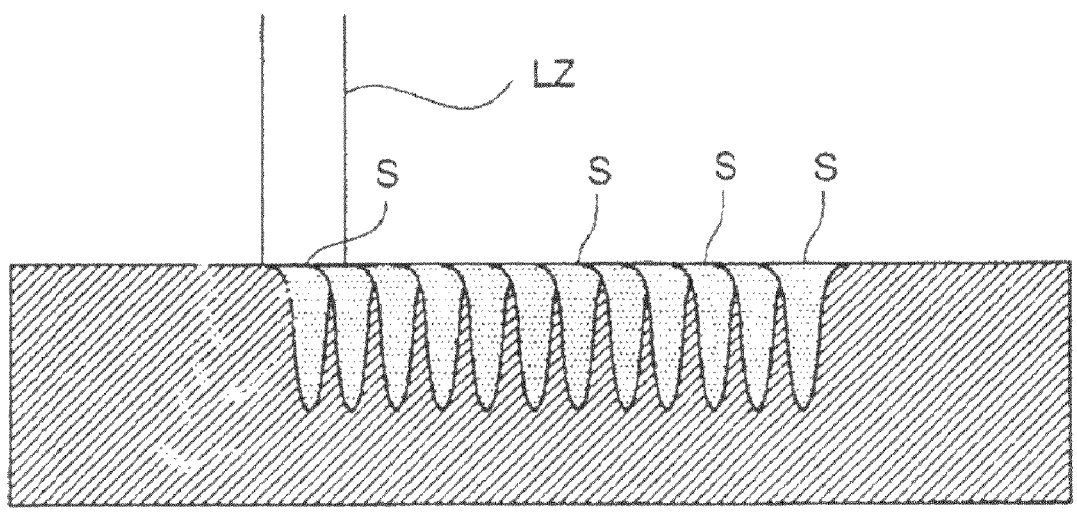
FIG. 25 is a cross-sectional view of FIG. 24.

As in this embodiment, if the laser beam LZ has a rectangular cross section, as shown in FIG. 5, even when the overlap ratio OL is set to a value close to 0% (about 5-10%, for example), a linear welding with a uniform width can be performed without any gaps, compared to the case shown in FIG. 21 and FIG. 23. Therefore, by using the laser beam irradiation apparatus 20 and the laser welding method according to this embodiment, seam welding can be performed with reliability by using the laser beam LZ, to the irradiation portion LP for the purpose of hermetic sealing, such as welding a battery to be used for precision instruments. As shown in FIG. 6, since the laser beam intensity distribution is uniform, not only the plane cross section shape of laser beam, but also the welding cross section in a penetration direction becomes more rectangular. Therefore, even if the overlap ratio is lowered with the smaller number of spots, series welding can be performed without loss of airtightness.

Figure 16:
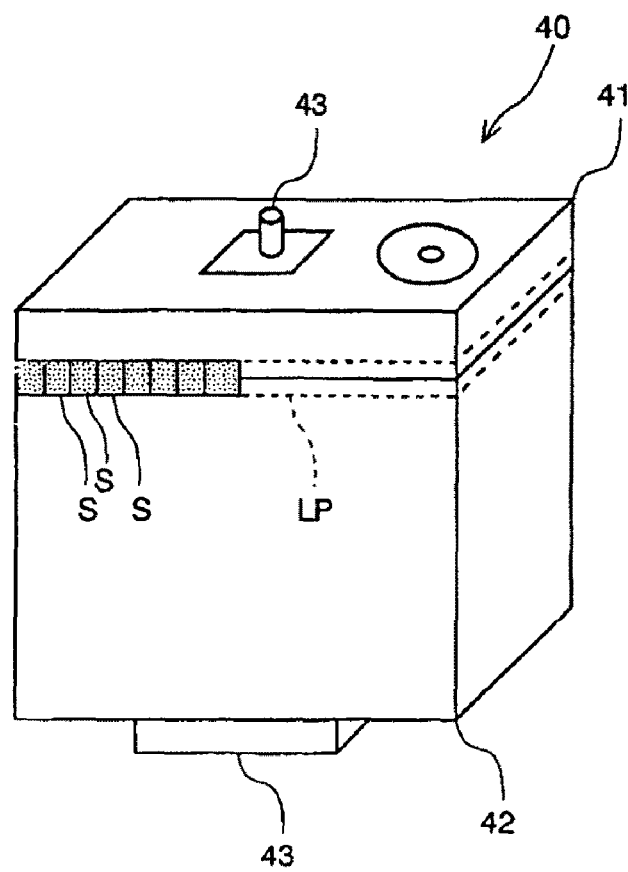
FIG. 16 is a perspective view of a battery to be welded by the laser beam irradiation apparatus according to the embodiment.

For example, as shown in FIG. 16, the case of a battery 40 is considered, in which a terminal 43 is formed both on a case 42 and a lid 41. In this case, the lid 41 is set to a predetermined position to be fitted into the case 42, and the battery 40 is formed by seam-welding the contact portion between the lid 41 and the case 42. For this seam-welding method, there is an assumption that the case 42 and the lid 41 are targets to be welded W in which the contact portion therebetween is an irradiation portion LP. A series of spots S of laser beam having a rectangular cross section are irradiated on the irradiation portion LP with no gap therebetween. In other words, series irradiation is performed at an overlap ratio OL of >0. The irradiation portion LP is welded in series (welding in a line having a uniform width). As a result, the hermetic seal of the battery 40 can be performed with reliability even with a smaller number of spots S of laser beam LZ, thereby improving the efficiency and speed of detailed seam welding.

As shown in FIG. 5, theoretically, seam-welding can be performed most efficiently at an overlap ratio OL of 0%. However, if there is a gap between neighboring spots S of laser beam LZ, it becomes impossible to hermetic-seal the irradiation portion LP. Therefore, the overlap ratio OL is preferably a value larger than 0%.

Next, referring to FIG. 7 to FIG. 14, a description is given for the relation between the length of the optical fiber 10 where the core 8 has a rectangular cross section therethrough (the predetermined distance FL of the optical fiber 10) and the cross-sectional intensity distribution of laser beam LZ. Four varieties of lengths FL of the optical fiber 10 are used 10 mm, 3 m, 5 m, and 10 m. Each side L of the core 8 of the optical fiber 10 is 0.53 mm (0.3 mm only when the length FL of the optical fiber 10 is 10 mm).

Figure 7:
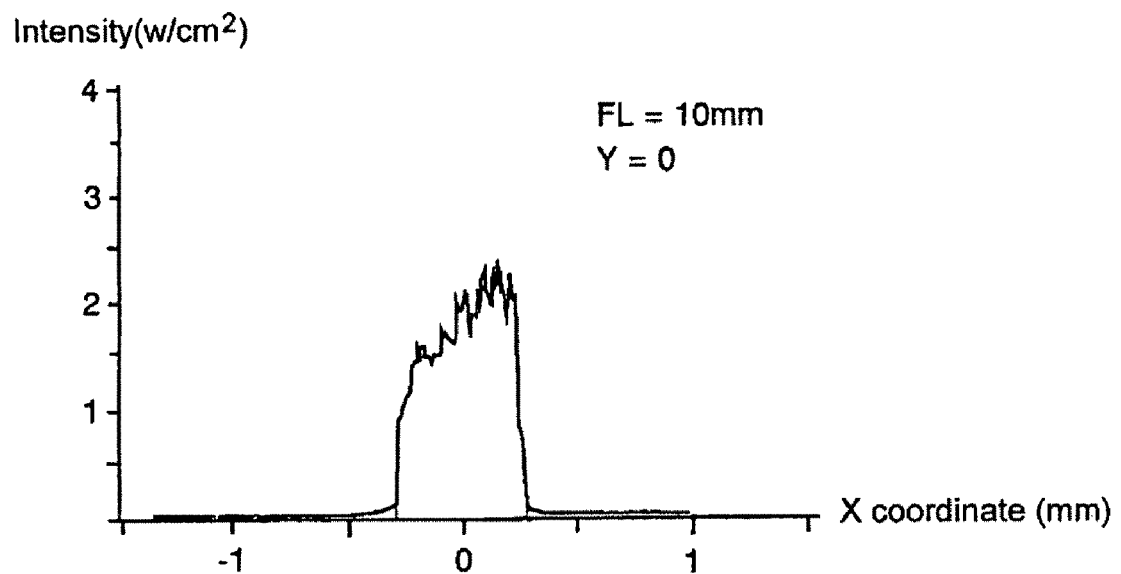
FIG. 7 is a graph showing a cross-sectional intensity distribution of laser beam when Y=0 at an optical fiber length of 10 mm.
Figure 8:
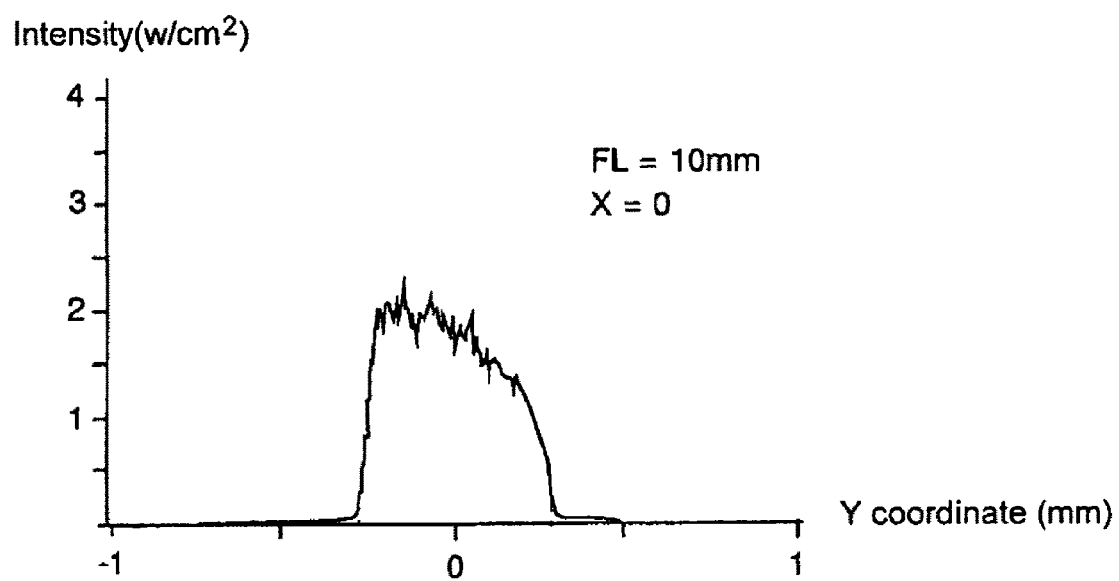
FIG. 8 is a graph showing a cross-sectional intensity distribution of laser beam when X=0 at an optical fiber length of 10 mm.

FIG. 7 and FIG. 8 show a cross-sectional intensity distribution of laser beam LZ when the length FL of the Optical fiber 10 is 10 mm. With the center of a spot S of the optical fiber 10 at the origin of XY coordinates as shown in FIG. 4, FIG. 7 shows a cross-sectional intensity distribution of laser beam LZ along the X coordinate when Y=0, and FIG. 8 shows a cross-sectional intensity distribution of laser beam LZ along the Y coordinate when X=0. As shown in FIG. 7 and FIG. 8, when the length FL of the optical fiber 10 is 10 mm, the intensity of laser beam LZ increases gradually at an end of the spot S of the optical fiber 10 (X, Y=−0.3 mm or 0.3 mm), and the intensity waveform of laser beam LZ has a shape similar to the sine wave or the cosine wave shown in the range of 0 degree to 90 degree. As shown in FIG. 7 and FIG. 8, the variation widths of the cross-sectional intensity distributions are large.

This means that the intensity waveform of laser beam LZ has a convex shape different from the ideal rectangular waveform when the length FL of the optical fiber 10 is 10 mm. Since the intensity of laser beam LZ between the maximum and minimum values changes rapidly, it is found that the cross-sectional intensity distribution of laser beam LZ is not uniform.

Figure 9:
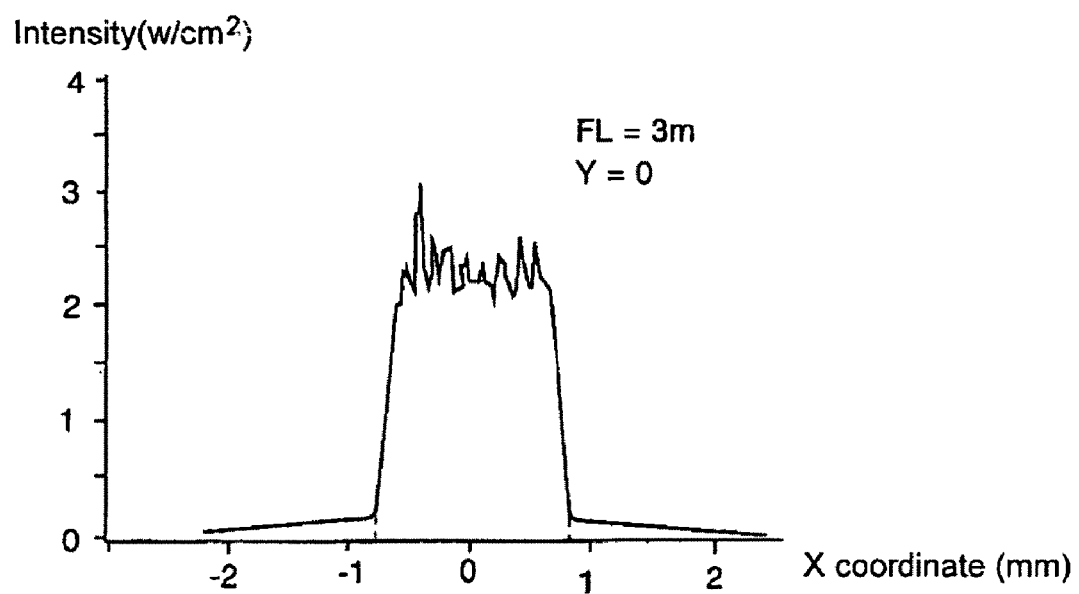
FIG. 9 is a graph showing a cross-sectional intensity distribution of laser beam when Y=0 at an optical fiber length of 3 m.
Figure 10:
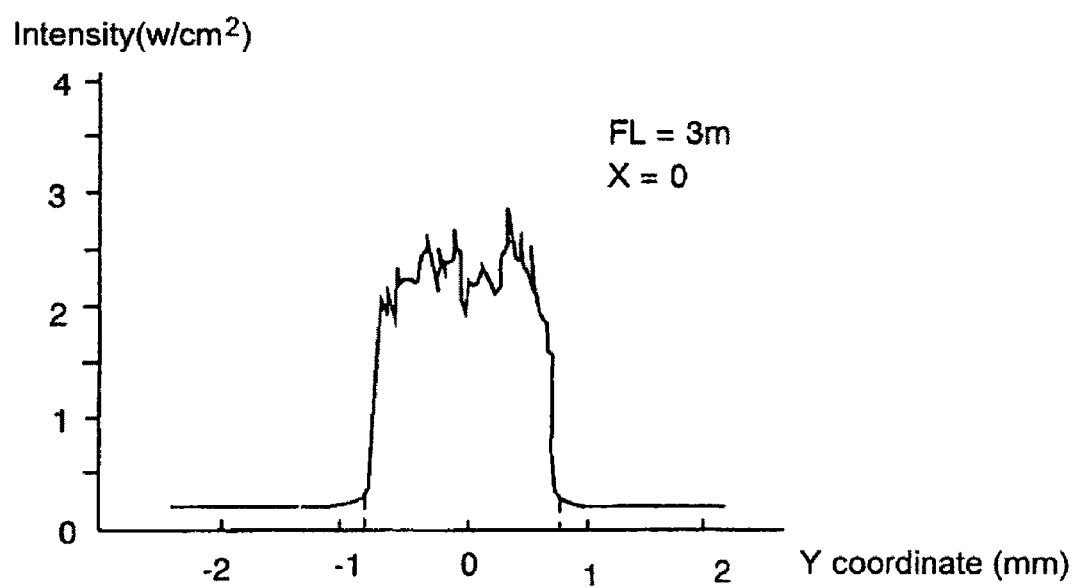
FIG. 10 is a graph showing a cross-sectional intensity distribution of laser beam when X=0 at an optical fiber length of 3 m.

FIG. 9 and FIG. 10 show a cross-sectional intensity distribution of laser beam LZ when the length FL of the optical fiber 10 is 3 m. FIG. 9 shows a cross-sectional intensity distribution of laser beam LZ along the X coordinate when Y=0, and FIG. 10 shows a cross-sectional intensity distribution of laser beam LZ along the Y coordinate when X=0. As shown in FIG. 9 and FIG. 10, the intensity waveform of laser beam LZ shown when the length FL of the optical fiber 10 is 3 m, increases rapidly at one end (X, Y=about −0.8 mm) of the spot S, slows down temporarily in the neighborhood of 2.2 W/cm2, and decreases rapidly at another end of the spot S (X, Y=about 0.8 mm). As shown in FIG. 9 and FIG. 10, the variation widths of the cross-sectional intensity distributions are small, compared to the cross-sectional intensity distribution shown in FIG. 7 and FIG. 8 when the length FL of the optical fiber 10 is 10 mm.

This means that the intensity waveform of laser beam LZ has a shape closer to the ideal rectangular waveform when the length FL of the optical fiber 10 is 3 m, compared to the case shown in FIG. 7 and FIG. 8 when the length FL of the optical fiber 10 is 10 mm. The intensity change of laser beam LZ between the maximum and minimum values is small. Therefore, it is found that the cross-sectional intensity distribution of laser beam LZ is uniform to some extent.

Figure 11:
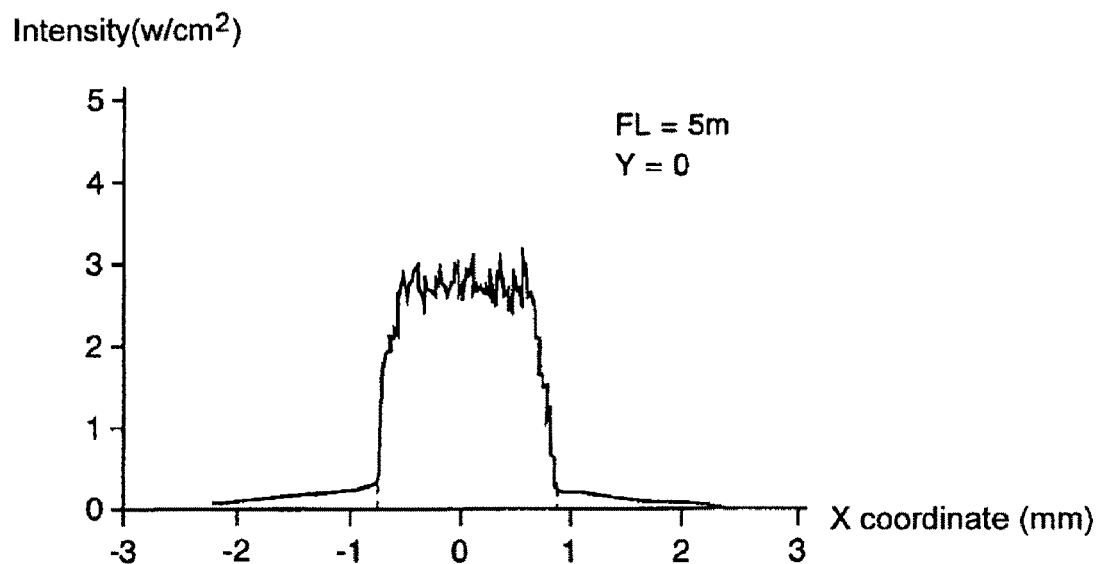
FIG. 11 is a graph showing a cross-sectional intensity distribution of laser beam when Y=0 at an optical fiber length of 5 m.
Figure 12:
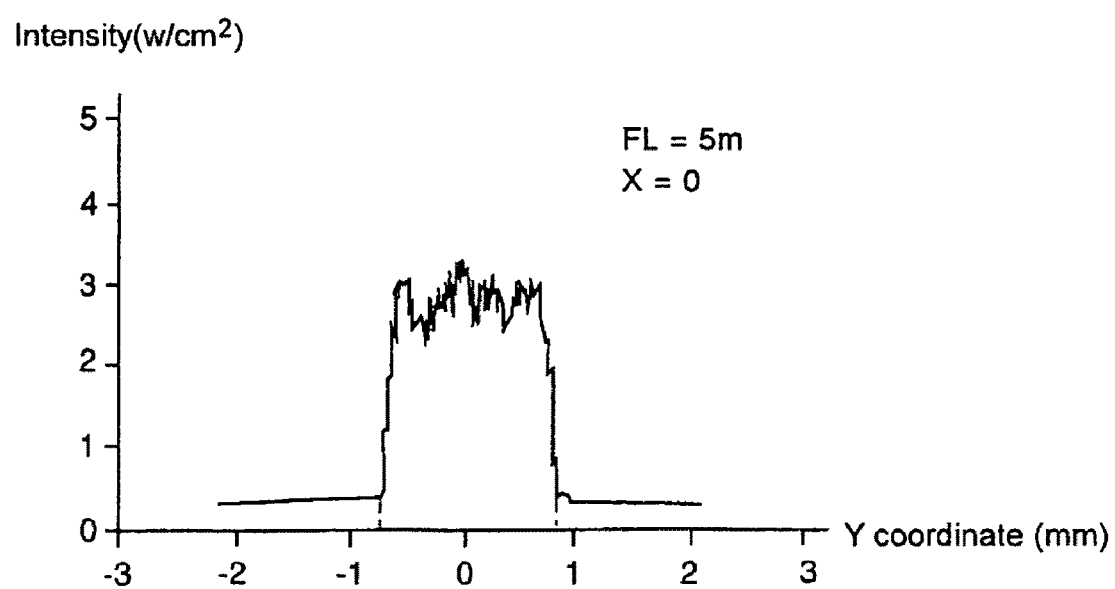
FIG. 12 is a graph showing a cross-sectional intensity distribution of laser beam when X=0 at an optical fiber length of 5 m.

FIG. 11 and FIG. 12 show a cross-sectional intensity distribution of laser beam LZ when the length FL of the optical fiber 10 is 5 m. FIG. 11 shows a cross-sectional intensity distribution of laser beam LZ along the X coordinate when Y=0, and FIG. 12 shows a cross-sectional intensity distribution of laser beam LZ along the Y coordinate when X=0. As shown in FIG. 11 and FIG. 12, the intensity waveform of laser beam LZ shown when the length FL of the optical fiber 10 is 5 m, increases rapidly at one end (X, Y=about −0.8 mm) of the spot S, slows down temporarily in the neighborhood of 2.6 W/cm2, and decreases rapidly at another end of the spot S (X, Y=about 0.8 mm). As shown in FIG. 11 and FIG. 12, the variation width of the cross-sectional intensity distribution is also small.

This means that the intensity waveform of laser beam LZ has a shape closer to the ideal rectangular waveform when the length FL of the optical fiber 10 is 5 m, similarly to the case shown in FIG. 9 and FIG. 10 when the length FL of the optical fiber 10 is 3 m. On the other hand, the intensity change of laser beam LZ between the maximum and minimum values is smaller than the case shown in FIG. 9 and FIG. 10 in which the length FL of the optical fiber 10 is 3 m. Therefore, it is found that the cross-sectional intensity distribution of laser beam LZ shown when the length FL of the optical fiber 10 is 5 m is more uniform than the intensity distribution shown in the case when the length FL is 3 m.

Figure 13:
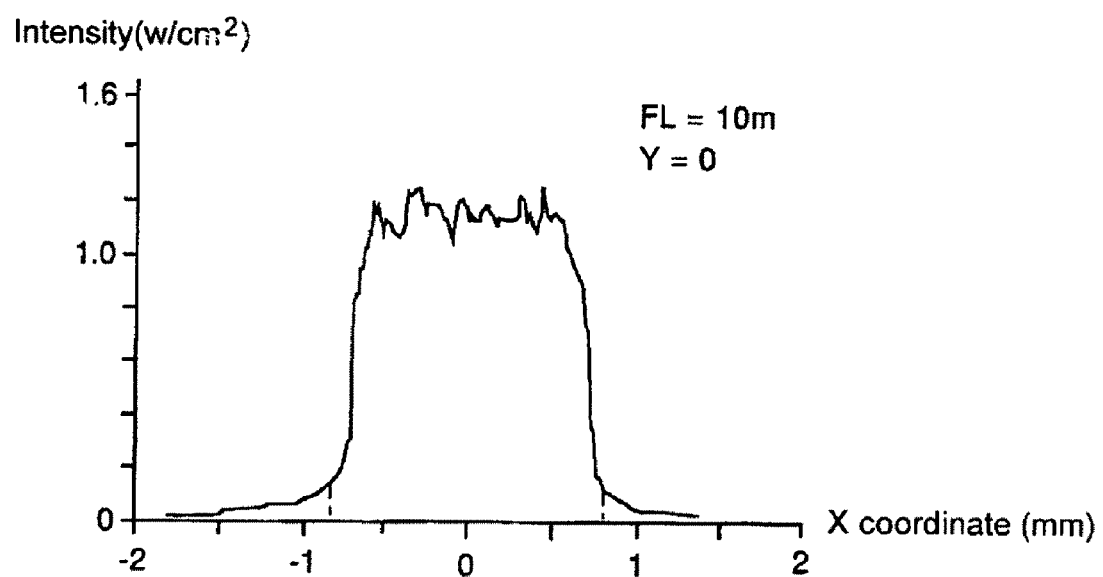
FIG. 13 is a graph showing a cross-sectional intensity distribution of laser beam when Y=0 at an optical fiber length of 10 m.
Figure 14:
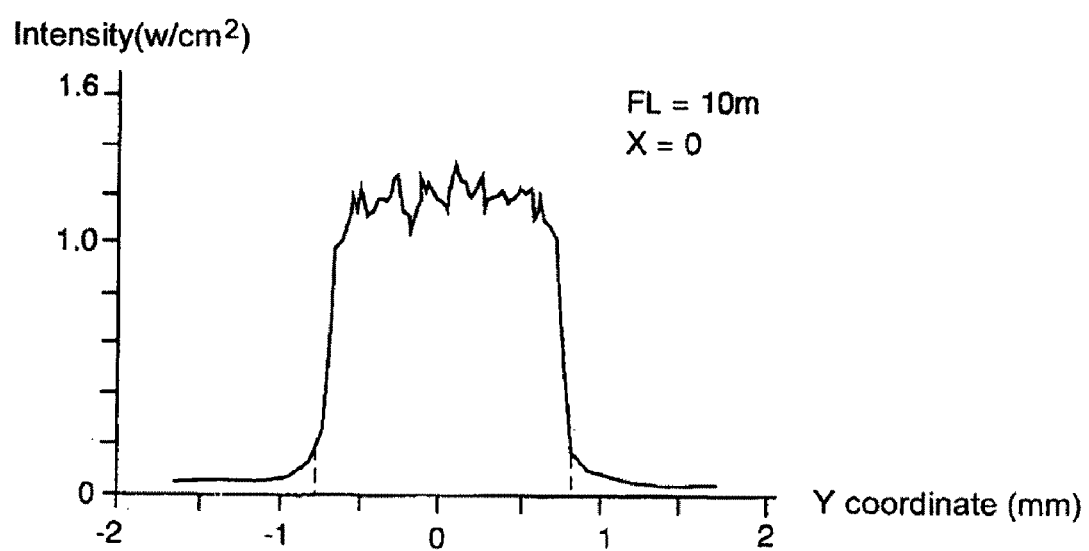
FIG. 14 is a graph showing a cross-sectional intensity distribution of laser beam when X=0 at an optical fiber length of 10 m.

FIG. 13 and FIG. 14 show a cross-sectional intensity distribution of laser beam LZ when the length FL of the optical fiber 10 is 10 m. FIG. 13 shows a cross-sectional intensity distribution of laser beam LZ along the X coordinate when Y=0, and FIG. 14 shows a cross-sectional intensity distribution of laser beam LZ along the Y coordinate when X=0. As shown in FIG. 13 and FIG. 14, the intensity waveform of laser beam LZ shown when the length FL of the optical fiber 10 is 10 m, increases rapidly at one end (X, Y=about −0.8 mm) of the spot S, slows down temporarily in the neighborhood of 1.15 W/cm2, and decreases rapidly at another end of the spot S (X, Y=about 0.8 mm). As shown in FIG. 13 and FIG. 14, the variation width of the cross-sectional intensity distribution is also small.

This means that the intensity waveform of laser beam LZ has a shape closer to the ideal rectangular waveform when the length FL of the optical fiber 10 is 5 m, similarly to the case when the length FL of the optical fiber 10 is 10 m, and to the case shown in FIG. 11 and FIG. 12 when the length FL of the optical fiber 10 is 5 m. The intensity change of laser beam LZ between the maximum and minimum values is smaller than the case shown in FIG. 11 and FIG. 12 in which the length FL of the optical fiber 10 is 5 m. Therefore, it is found that the cross-sectional intensity distribution of laser beam LZ shown when the length FL of the optical fiber 10 is 10 m is more uniform than the intensity distribution shown in the case when the length FL is 5 m.

In other words, as has been described above, it is found that, as the optical fiber 10 becomes longer, the intensity waveform of laser beam LZ becomes closer to the ideal rectangular waveform, as well as the cross-sectional intensity distribution of laser beam LZ becomes uniform. Although the cross-sectional intensity distribution waveforms have been described in FIG. 7 to FIG. 14, the values thereof can be ignored. This is because the peak absolute values are time-variable.

Next, a description is given for the relation between the length FL of the optical fiber 10 in which the core 8 has a rectangular cross section therethrough and the outgoing NA thereof. Each side L of the rectangular core 8 of the used optical fiber 10, similarly to the optical fiber 10 which has been measured for intensity distribution) is 0.53 mm (0.3 mm only when the length FL of the optical fiber 10 is 10 mm). The incoming NA thereof is 0.0375, and the fiber NA thereof is 0.4.

TABLE 1

| | Length | | | |
|---|---|---|---|---|
| | 10 mm | 3 m | 5 m | 10 m |
| Outcoming NA | 0.0375 | 0.0375 | 0.045 | 0.086 |

TABLE 1 lists outgoing NA values shown when the length FL of the optical fiber 10 in which the core 8 has a rectangular cross section therethrough is 10 mm, 3 m, 5 m, and 10 m, respectively. As shown in TABLE 1, when the length FL of the optical fiber 10 is 3 m or below, the outgoing NA of the optical fiber 10 is almost equal to the incoming NA thereof. When the length FL of the optical fiber 10 is 5 m, the outgoing NA of the optical fiber 10 is 0.045. The outgoing NA thereof is larger than the incoming NA. Similarly, when the length FL of the optical fiber 10 is 10 m, the outgoing NA of the optical fiber 10 is 0.085. The outgoing NA is more than twice as large as the incoming NA thereof, and larger than the outgoing NA shown when the length FL the optical fiber 10 is 3 m. In other words, as the optical fiber 10 becomes longer, the outgoing NA thereof tends to increase rapidly.

Figure 15:
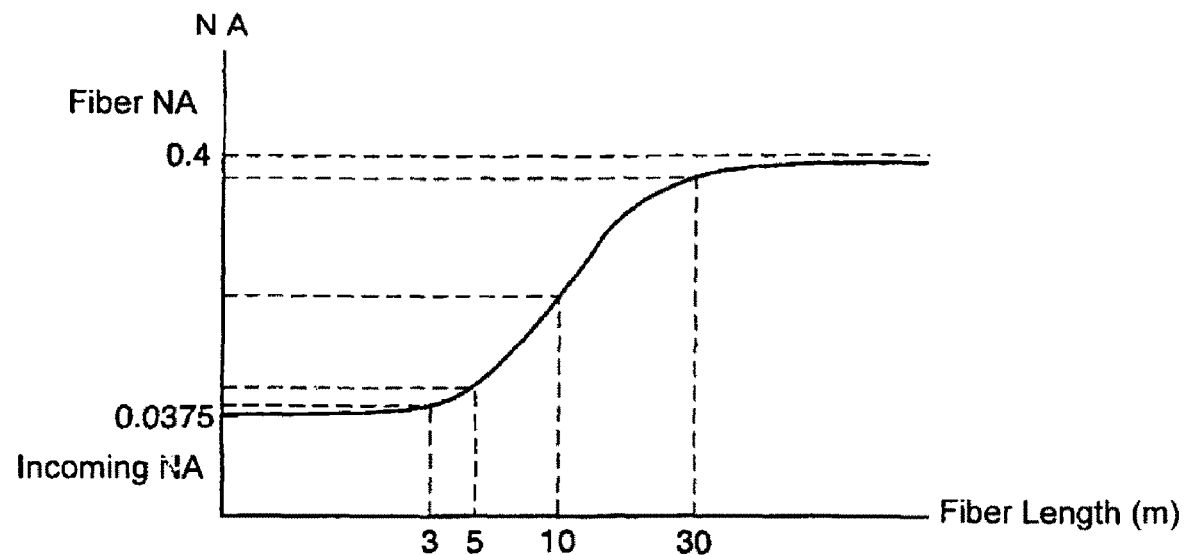
FIG. 15 is a graph showing the relation between the length of the optical fiber in which the core thereof has a rectangular cross section therethrough, and the outgoing NA thereof.

FIG. 15 shows the relation between the length FL of the optical fiber 10 in which the core 8 has a rectangular cross section therethrough and the outgoing NA thereof. As has been described above, when the length FL of the optical fiber 10 is 3 m or below, the outgoing NA of the optical fiber 10 is almost equal to the incoming NA thereof. However, when the optical fiber 10 is longer than 3 m, the outgoing NA of the optical fiber 10 increases gradually, and the rate of change thereof becomes larger. Since the outgoing NA does not exceed the fiber NA value, the outgoing NA changes gradually so as to approach asymptotically NA=0.4. However, if the optical fiber 10 is too long, the maximum transmission angle of laser beam LZ becomes larger. This means that the usability of laser beam LZ is reduced. Therefore, the optical fiber 10 is preferably about 30 m.

Specifically, if a consideration is given to the aforementioned cross-sectional intensity distribution of laser beam LZ, the outgoing NA, and the usability of laser beam LZ, it is found that the length FL of the optical fiber 10 is preferably set to about 3 m to 30 m, more preferably to 5 m to 10 m.

Figure 17:
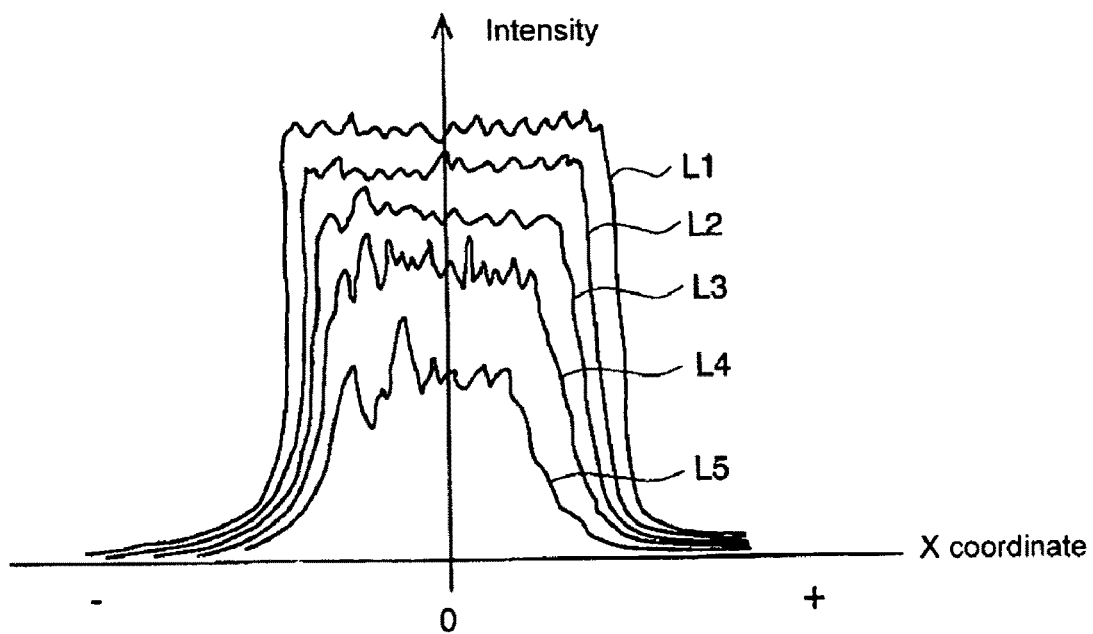
FIG. 17 is a graph showing a cross-sectional intensity distribution of laser beam when Y=0, with varieties of optical fiber core sizes, relative to a laser beam wavelength.
Figure 18:
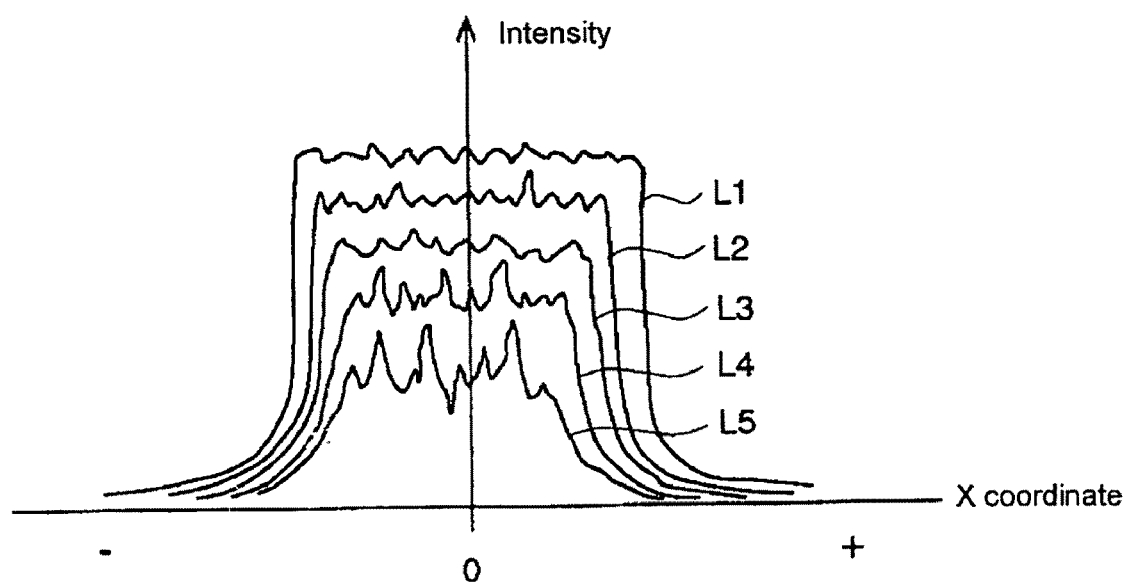
FIG. 18 is a graph similar to FIG. 17, relative to another laser beam wavelength.
Figure 19:
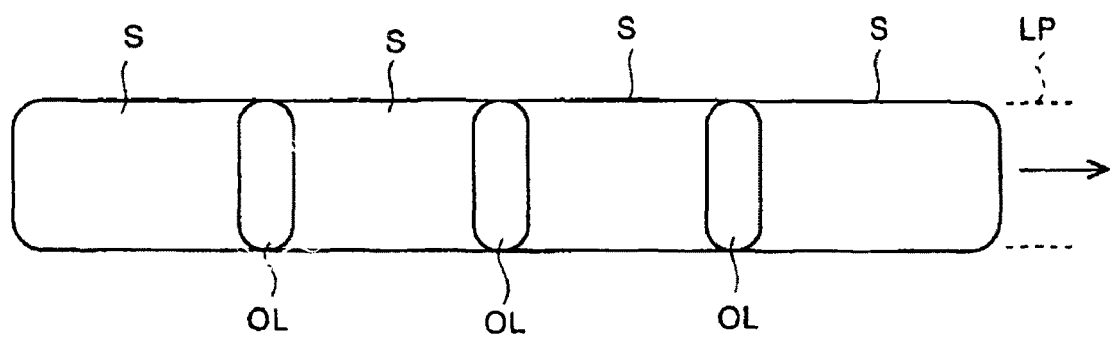
FIG. 19 is a plan view showing a state where seam welding has been performed by using a laser beam having an oblong rectangular cross section.

Next, referring to FIG. 17 to FIG. 19, a description is given for the miniaturization of the rectangular cross section of the laser beam LZ to be applied to an irradiation portion LP of a target to be welded W, and for the uniformity of a cross-sectional intensity distribution of laser beam.

At first, in order to miniaturize a rectangular cross section of laser beam LZ, each side L of the rectangular cross section of the core 8 of the optical fiber 10 is reduced in size.

Relative to the oscillation wavelength $\lambda=1064$ nm (fundamental wave) of the YAG laser shown in FIG. 1, the length L of each side of the core 8 is varied as follows:
L1=520 μm=489λ;
L2=350 μm=329λ;
L3=266 μm=250λ;
L4=175 μm=164λ;
L5=50 μm=46λ;

The tendency of the cross-sectional intensity distribution of laser beam LZ when Y=0 along the X coordinate is obtained similarly to FIG. 13. The result is shown in FIG. 17.

Relative to the oscillation wavelength $\lambda=532$ nm (SHG), the length L of each side of the core 8 is varied as follows:
L1=260 μm=489λ;
L2=175 μm=329λ;
L3=133 μm=250λ;
L4=87 μm=164λ;
L5=24 μm=46λ;

The tendency of the cross-sectional intensity distribution of laser beam LZ when Y=0 along the X coordinate is obtained similarly to FIG. 13. The result is shown in FIG. 18.

According to FIG. 17 and FIG. 18, when the length of each side of the core 8 is L1, L2, L3, or L4, the laser beam intensity waveform has a shape similar to the ideal rectangular waveform, and the intensity change is small. On the other hand, when the length of each side of the core 8 is L5, the laser beam intensity waveform has a shape different from the ideal rectangular waveform, and the intensity change is large. From this result, in order to miniaturize a rectangular cross section of laser beam LZ as well as to maintain the uniformity of a cross-sectional intensity distribution of laser beam, L1, L2, L3, and L4 satisfy requirements while L5 does not satisfy the requirements. Specifically, it is found that, in order to miniaturize a rectangular cross section of laser beam LZ as well as to maintain the uniformity of a cross-sectional intensity distribution of laser beam, each side L of the rectangular cross section has to be 150 times as long as the wavelength λ of the laser beam.

Each side L of a rectangular cross section is preferably 250 times to 350 times as long as the wavelength λ of laser beam to make the cross-sectional intensity distribution of laser beam more uniform.

In order to miniaturize a rectangular cross section of laser beam LZ, since a short-wavelength light source which is available at an oscillation wavelength $\lambda=532$ nm (SHG) can miniaturize the core 8 more effectively, the oscillation wavelength λ is preferably 600 nm or below.

The miniaturization of the core 8 has the lower limit in terms of maintain a cross-sectional intensity distribution of laser beam. Therefore, in order to further miniaturize a rectangular cross section of laser beam LZ, as has been described above, it is recommended that each side of the rectangle defined by the laser beam LZ emitted from the output side face 10b of the optical fiber 10 should be optically reduced by the emission optical unit 11 so that each side is ½ to ⅕ of the original length thereof in the irradiation portion LP. Practically, the outgoing NA from the optical fiber 10 has to be 0.1 or above. If the reducing scaling factor is ⅕ or below, the condenser NA becomes larger, specifically 0.5 or above. The focus depth then becomes less, which is unpractical.

As shown in FIG. 19, the rectangular cross section of the core 8 of the optical fiber 10 is preferably formed to be oblong. This allows the overlap ratio of the next spot S to be further lower. Since a beam area can be larger even with the same line width, the uniformity of a cross-sectional intensity distribution of laser beam LZ can be improved. In other words, while using a thick optical fiber 10, a thin laser beam can be emitted, and the micromachining speed is improved.

By employing a known lateral multimode laser oscillator (not shown) with an M2 of about 10 to 30 as a laser beam generation means, the uniformity of a cross-sectional intensity distribution of laser beam LZ can be improved. A vertical multimode laser oscillator (not shown) can also be employed.

As has been described above, in the laser beam irradiation apparatus 20 according to this embodiment, since laser welding is performed by forming the cross section shape of laser beam LZ to be irradiate into a rectangular shape, even when the overlap ratio OL of laser beam LZ becomes lower, a linear welding with a uniform width can be performed accurately. Since the intensity distribution of laser beam LZ is uniform, not only the plane cross section shape of a laser beam LZ, but also the cross section in a weld penetration direction, are rectangular. Therefore, even if the overlap ratio is lowered thereby making the number of spots smaller, series welding can be performed without loss of airtightness. Furthermore, each side of the rectangular cross section of the core 8 of the optical fiber 10 is formed to be 150 times as long as or longer than the wavelength of a laser beam LZ, and the emission optical unit 11 reduces the laser beam LZ emitted from the output side face of the optical fiber 10. Therefore, the miniaturization of the rectangular cross section of the laser beam LZ to be applied to an irradiation portion LP of a target to be welded W, and the uniformity of a cross-sectional intensity distribution of laser beam LZ are achieved with reliability. As a result, without loss of airtightness to be obtained by seam welding, welding efficiency and speed can be improved, thereby irradiating a laser beam which is more detailed and accurate.

Next, a description is given for a laser beam irradiation apparatus 20 according to a second embodiment of the present invention. The structural member which has a similar function in the first embodiment has the same reference number, and its detailed description is omitted here.

Figure 20:
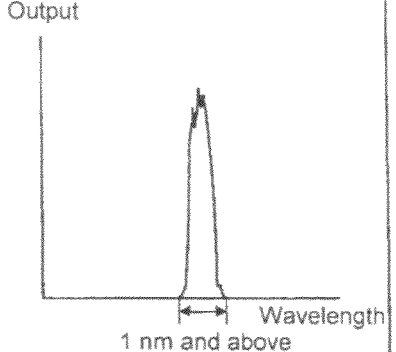
FIG. 20 includes a conceptual diagram showing an optical path between both mirrors in a resonator when employing a vertical multimode laser oscillator, a single mode laser oscillator, and a lateral multimode laser oscillator respectively, and FIG. 20 also includes a graph showing the relation between the output of generated laser beam and the wavelength thereof.

In the second embodiment, a vertical multimode laser oscillator (not shown) is employed for the laser beam generation means 30. As shown in FIG. 20, the vertical multimode laser oscillator has a single optical path between the total reflection mirror 5 and the output mirror 7 in a resonator. In the vertical multimode laser oscillator, a plurality of wavelengths λ of laser beam LZ are generated. The width of the wavelength λ of the laser beam LZ is commonly 1 nm or above.

In terms of the size of the core 8 of the optical fiber 10, each side L of the rectangular cross section is 25 times as long as or longer than the wavelength λ of the laser beam LZ. Although the rectangular cross section may be square similarly to the first embodiment, the rectangular cross section is preferably oblong from the viewpoint of lowering the overlap ratio of the neighboring spot S as well as improving the uniformity of the cross-sectional intensity distribution of laser beam LZ. In this embodiment, for transmitting a laser beam LZ having an oscillation wavelength λ of 1064 nm, either the optical fiber 10 where the rectangular cross section of the core 8 is a square having each side of 50 μm, or the optical fiber 10 where the rectangular cross section of the core 8 is an oblong having facing two sides of 50 μm and different facing two sides of 100 μm, is employed.

In the laser beam irradiation apparatus 20 according to the second embodiment, similarly to the first embodiment, the predetermined distance FL from the output side face 10*b* of the optical fiber 10 to the range where the cross section of the core 8 is rectangular, is preferably 3 m or above and about 30 m or below, and more preferably in the range of about 5 m to 10 m.

On the other hand, in the laser beam irradiation apparatus 20 according to the second embodiment, differently from the first embodiment, each side of the rectangular defined by the laser beam LZ emitted from the output side face 10*b* of the optical fiber 10 does not have to be optically reduced by the emission optical unit 11 in the irradiation portion LP. If a thin optical fiber 10 is employed as the optical fiber 10, where each side of the rectangular cross section of the core 8 is 25 times as long as or longer than the wavelength λ of the laser beam LZ, and about 50 times as long as the wavelength λ as described above, the laser beam LZ emitted from the output side face 10*b* of the optical fiber 10 can be emitted from the emission optical unit 11, without being optically reduced in the emission optical unit 11, so that welding, micromachining, component removal from a surface metal layer, or the like can be performed.

Next, a description is given for effects of the laser beam irradiation apparatus 20 according to the second embodiment.

In the second embodiment, similarly to the first embodiment, by using the optical fiber 10 where the core cross section thereof is formed to be rectangular in a predetermined distance from the output side face 10*b*, laser beam LZ having a rectangular cross section can be irradiated.

Therefore, in the laser beam irradiation apparatus 20 according to the second embodiment, similarly to the first embodiment, for example, seam welding can be performed with reliability by using the laser beam LZ, to the irradiation portion LP for the purpose of hermetic sealing. Furthermore, even if the overlap ratio is lowered thereby making the number of spots smaller, series welding can be performed without loss of airtightness, thereby improving welding efficiency.

In this embodiment, by employing a vertical multimode laser oscillator as the laser beam generation means 30 as well as employing a thin optical fiber 10 where each side of the rectangular cross section of the core 8 is 25 times as long as or longer than the wavelength λ and about 50 as long as the wavelength λ as described above, the laser beam LZ emitted from the thin optical fiber 10, the variation width of the cross-sectional intensity distribution becomes small and the shape of the intensity waveform becomes closer to the ideal rectangular waveform. The intensity change of laser beam LZ between the maximum and minimum values also becomes small. Therefore, the cross-sectional intensity distribution of laser beam LZ is uniform to some extent. Furthermore, as the width of the wavelength λ of the laser beam LZ generated by the vertical multimode laser oscillator is 1 nm or above and greater, the intensity waveform of laser beam LZ has a shape similar to the ideal rectangular waveform, thereby uniforming the cross-sectional intensity distribution. In this way, the laser beam irradiation apparatus 20 according to this embodiment, which employs the vertical multimode laser oscillator as the laser beam generation means 30, can emit a thin laser beam LZ suited for welding, micromachining, and the like, by using the thin optical fiber 10.

On the other hand, as shown in FIG. 20, in the laser beam irradiation apparatus, if a single mode laser oscillator is employed as a laser beam generation means, having a single optical path between mirrors in a resonator, for generating a single wavelength λ of laser beam LZ, while using a thin optical fiber similarly above, the variation width of the cross-sectional intensity distribution of laser beam LZ becomes great, and the shape of the intensity waveform of laser beam LZ becomes a convex shape different from the ideal rectangular waveform. Since the intensity change of laser beam LZ between the maximum and minimum values is abrupt, the cross-sectional intensity distribution is not uniform. In this way, the laser beam irradiation apparatus which employs the single mode laser oscillator as the laser beam generation means 30 cannot generate a laser beam LZ suited for welding, micromachining, and the like, if the thin optical fiber 10 is employed.

In the laser beam irradiation apparatus, if a lateral multimode laser oscillator is employed as a laser beam generation means, having a plurality of optical paths between mirrors in a resonator, for generating a plurality of wavelengths λ of laser beam LZ, while using a thin optical fiber similarly above, the intensity waveform of laser beam LZ in the cross-sectional intensity distribution of laser beam LZ is closer to be rectangular than a case in which single mode laser oscillator is employed, but convex shape compared to a case in which a vertical multimode oscillator is employed. Although the intensity change of laser beam LZ between the maximum and minimum values is more gradual than a case in which a single mode laser oscillator is employed, more abrupt than a case in which a vertical multimode laser oscillator is employed, thereby preventing the cross-sectional intensity distribution of laser beam LZ from being uniformed. In this way, the laser beam irradiation apparatus which employs the lateral multimode laser oscillator as the laser beam generation means cannot generate a laser beam LZ suited for welding, micromachining, and the like, if the thin optical fiber 10 is employed.

Therefore, the laser beam irradiation apparatus 20, by thus employing the aforementioned vertical multimode laser oscillator as the laser beam generation means 30, can achieve the miniaturization of the core 8 of the optical fiber 10, as well as can generate thin laser beam LZ without optically reducing laser beam LZ by the emission optical unit 11.

The present invention is not limited to the aforementioned embodiments. It should be understood that various other changes may be made therein as necessary.

For example, although the flash lamp 2 is employed for the laser beam generation means 1, a semiconductor laser diode (LDA) 2B may be employed in another embodiment as shown in FIG. 21, instead of the flash lamp 2. In this case, switching of laser beam (pulse lighting) is performed by the on-off control of a Q switch provided in a laser resonator of the power supply 3.

Although the laser beam irradiation apparatus 20 of these embodiments have been described by mainly taking a laser welding machine as an example, if the laser beam irradiation apparatus 20 of these embodiments is employed as a laser beam processing apparatus with a surface metal layer or the like as the target W, the laser beam irradiation apparatus 20 of these embodiments can be used for the removing a surface metal layer, a thin film formed on a surface, and the like. Specifically, by using a laser beam machining method based on the laser welding method according to these embodiments, rectangular etching can be performed on a surface metal layer or the like, thereby achieving accurate removal of a surface metal layer or the like.

The invention claimed is:

1. A laser beam irradiation apparatus comprising:
    laser beam generation means for emitting a laser beam,
    an optical fiber for transmitting the laser beam incident on an input side face thereof to an output side face thereof,
    an incident optical unit for making incident the laser beam emitted from the laser beam generation means on the input side face of the optical fiber, and
    an emission optical unit for applying the laser beam emitted from the output side face of the optical fiber to an irradiation portion, wherein
    the laser beam generation means includes a vertical multimode laser oscillator generating, the laser beam, a width of a wavelength of the laser beam being 1 nm or greater, and
    a cross section of a core of the optical fiber is rectangular for 5 m to 10 m from an output side face of the core, and each side of the rectangular cross section has a length 25 times as long as or longer than the wavelength of the laser beam.

2. The laser beam irradiation apparatus according to claim 1, wherein each side of the rectangular cross section of the core of the optical fiber has a length 50 times to 100 times as long as the wavelength of the laser beam.

3. The laser beam irradiation apparatus according to claim 1, wherein the rectangular cross section of the core of the optical fiber is oblong with a first pair of facing sides thereof having a length 25 times as long as or longer than the wavelength of the laser beam and a second pair of facing sides thereof having a length 2 times as long as or less than the length of the first pair of facing sides.

4. The laser beam irradiation apparatus according to claim 2 or 3, wherein the wavelength of the laser beam emitted from the laser beam generation means is 1000 nm or greater, and the rectangular cross section of the core of the optical fiber is square having a length for each side 50 times as long as the wavelength of the laser beam or oblong with a first pair of facing sides thereof being 50 μm in length and a second pair of facing sides thereof being 100 μm in length.

* * * * *